July 22, 1930.     H. MOCK     1,771,186
SERVING ELEMENT FOR ELECTRIC REFRIGERATORS
Filed June 20, 1928
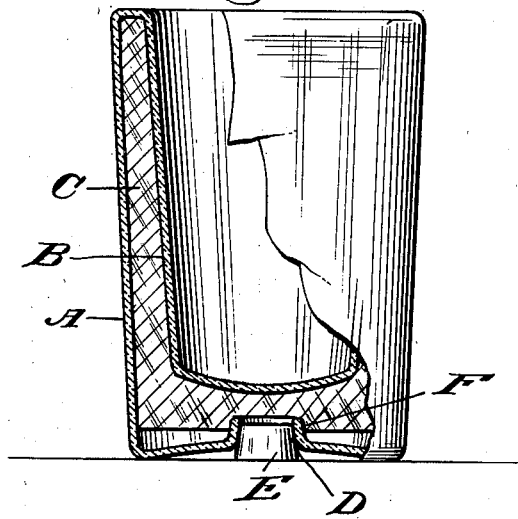
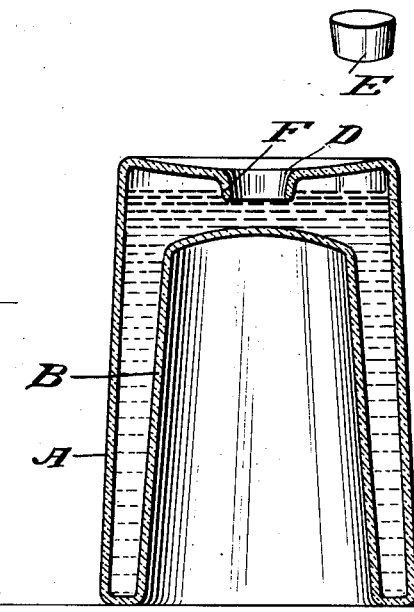
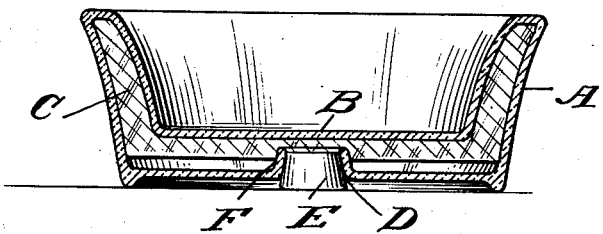
Hugo Mock
INVENTOR Patented July 22, 1930

1,771,186

UNITED STATES PATENT OFFICE

HUGO MOCK, OF NEW YORK, N. Y.

SERVING ELEMENT FOR ELECTRIC REFRIGERATORS

Application filed June 20, 1928. Serial No. 286,942.

This invention relates to improvements in serving elements for electric refrigerators and has for its object the provision of a serving element in which articles of food may be cooled or served cold without the admixture of ice.

A particular object of the invention is the provision of a serving element which may be cooled in an electric or similar refrigerator and which may be used in the serving of orange ice, fruits and similar articles of food without the addition of ice.

Further objects of the invention will be apparent from the specification and drawings in which—

Fig. 1 is a partial vertical section, broken away, of my improved device,

Fig. 2 is a vertical section of the same device showing same in the position in which it is placed in the refrigerator, and Fig. 3 is a modification of my serving element used for serving grapefruit or similar articles of food.

Essentially, my improved serving element consists of a double walled vessel, the walls of which are made of glass or metal, the space between the walls being partially but not completely filled with water. In the drawings, the outside wall is designated as A, the inside wall as B, the water between the two walls as C, and there is an opening at the bottom of the device D closed by a stopper E. As access to the inside of the device is not usually required, the opening D may be hermetically closed in which case no stopper is required, but the shape of the bottom of the device is important and forms one of the features of my invention. As seen in Figs. 1 and 2, the central bottom portion is indented for the following reason:

In actual operation, the space between the walls is almost filled with water and placed upside down in a cooling medium such as an electric refrigerator for refrigerating purposes. Ice forms in the space between the walls reaching almost to the bottom of the device as seen in Fig. 1. When the device is used for service, as for instance when orange juice is poured therein, the ice between the walls naturally commences to melt and owing to the fact that the bottom layer of ice is the last to melt, the ice or cooling liquid in contact with the inner wall B will stay in position, whereas if the retaining member F were not present, the ice in the narrowest portion of the space between the two walls would melt first and the melted liquid would rest upon the bottom of the device. Where, however, the ice is frozen into position as shown in Fig. 2, the layer of ice in contact with the central bottom portion will resist the pressure of the liquid above it and keep such liquid in close contact to the inner wall of the device B. In Fig. 3, I have illustrated a modification of the double walled device suitable for serving grapefruit, oysters, etc.

Having fully described my invention, what I claim is:—

1. A serving element for serving food products cold consisting of a double walled vessel, said walls tapering toward the top of the concavity in said vessel in which said foods are served and becoming wider toward the bottom, the central portion of the bottom of said vessel being raised so as to support a layer of ice contacting said raised portion.

2. A serving element for serving food products cold consisting of a double walled vessel having liquid frozen between said walls, said walls tapering toward the top of said vessel, the distance between said walls becoming wider toward the bottom of said vessel, and means for sealing the liquid placed between the walls of said vessel.

3. A serving element for food products consisting of a double walled vessel, having ice frozen between said walls, and partially filling the space between said walls, and a concavity in said vessel in which food is to be served, the center of the base of said vessel being upraised.

4. A serving element for food products consisting of a double walled vessel having ice frozen between said walls, and partially filling the space between said walls, and a concavity in said vessel in which food is to be served, a portion of the base being upraised to support the ice frozen between said walls.

5. A concave serving element consisting of a double walled vessel, a liquid frozen between walls of said vessel, an air space adjacent said frozen liquid, and an element in the base of said vessel serving to keep said frozen liquid in contact with the concavity in said vessel.

In testimony whereof I hereunto affix my signature.

HUGO MOCK.